US011417999B2

(12) United States Patent
Pierrot et al.

(10) Patent No.: US 11,417,999 B2
(45) Date of Patent: Aug. 16, 2022

(54) FEMTOSECOND FIBER OSCILLATOR

(71) Applicant: Lumentum Operations LLC, Milpitas, CA (US)

(72) Inventors: Simonette Pierrot, Dietikon (CH); Martin H. Muendel, Oakland, CA (US)

(73) Assignee: Lumentum Operations LLC, San Jose, CA (US)

( * ) Notice: Subject to any disclaimer, the term of this patent is extended or adjusted under 35 U.S.C. 154(b) by 130 days.

(21) Appl. No.: 16/692,467

(22) Filed: Nov. 22, 2019

(65) Prior Publication Data

US 2020/0412077 A1   Dec. 31, 2020

Related U.S. Application Data

(60) Provisional application No. 62/867,750, filed on Jun. 27, 2019.

(51) Int. Cl.
*H01S 3/067* (2006.01)
*H01S 3/11* (2006.01)
(Continued)

(52) U.S. Cl.
CPC ........ *H01S 3/06791* (2013.01); *H01S 3/0675* (2013.01); *H01S 3/08009* (2013.01); *H01S 3/08027* (2013.01); *H01S 3/094003* (2013.01); *H01S 3/1118* (2013.01); *H01S 3/1603* (2013.01); *G02B 5/1814* (2013.01); *G02B 27/4277* (2013.01); *H01S 3/0805* (2013.01); *H01S 3/1608* (2013.01);
(Continued)

(58) Field of Classification Search
CPC ........ H01S 3/1112–1121; H01S 3/0675; H01S 3/08009; H01S 3/08027; H01S 3/06791
See application file for complete search history.

(56) References Cited

U.S. PATENT DOCUMENTS 4,287,486 A * 9/1981 Javan .................. H01S 3/07
372/100
7,991,022 B1 * 8/2011 Soh .................... H01S 3/302
372/3

(Continued)

OTHER PUBLICATIONS

Paschotta, Rudiger. "Mode Locking." RP Photonics Encyclopedia. https://www.rp-photonics.com/mode_locking.html [retrieved Oct. 7, 2019].

(Continued)

*Primary Examiner* — Tod T Van Roy
(74) *Attorney, Agent, or Firm* — Harrity & Harrity, LLP

(57) ABSTRACT

An optical assembly provides dispersion control, modelocking, spectral filtering, and/or the like in a laser cavity. For example, the optical assembly may comprise a diffraction grating pair arranged to temporally and spatially disperse a beam on a forward pass through the optical assembly, a reflective device at an end of the optical assembly, and a focusing optic arranged to create a beam waist at the reflective device. The beam waist created at the reflective device may cause the beam to be inverted on a reverse pass through the optical assembly, and a temporal dispersion and a spatial dispersion of the beam may be doubled on the reverse pass through the optical assembly to form a temporally and spatially dispersed output from the optical assembly.

20 Claims, 7 Drawing Sheets

(51) Int. Cl.
    *H01S 3/094*     (2006.01)
    *H01S 3/16*     (2006.01)
    *H01S 3/08*     (2006.01)
    *G02B 5/18*     (2006.01)
    *G02B 27/42*     (2006.01)

(52) U.S. Cl.
    CPC ........... *H01S 3/1611* (2013.01); *H01S 3/1613* (2013.01); *H01S 3/1616* (2013.01); *H01S 3/1618* (2013.01)

(56) References Cited

U.S. PATENT DOCUMENTS

| | | | | |
|---|---|---|---|---|
| 8,654,799 B2 * | 2/2014 | Simanovski | ........ | H01S 3/08009 |
| | | | | 372/6 |
| 9,059,564 B2 * | 6/2015 | Simanovski | ........ | H01S 3/08009 |
| 9,172,206 B2 * | 10/2015 | Ota | ........ | H01S 3/302 |
| 9,705,277 B2 * | 7/2017 | Das | ........ | H01S 3/06791 |
| 10,965,088 B2 * | 3/2021 | Heckl | ........ | H01S 3/067 |
| 2009/0003391 A1 * | 1/2009 | Li | ........ | H01S 3/06791 |
| | | | | 372/6 |
| 2014/0341237 A1 * | 11/2014 | Pan | ........ | H01S 3/1112 |
| | | | | 372/6 |
| 2016/0097963 A1 * | 4/2016 | Fermann | ........ | H01S 3/0092 |
| | | | | 359/276 |
| 2016/0352064 A1 * | 12/2016 | Wise | ........ | H01S 3/2333 |

OTHER PUBLICATIONS

Paschotta, Rudiger. "Soliton Mode Locking." RP Photonics Encyclopedia. https://www.rp-photonics.com/soliton_mode_locking.html [retrieved Oct. 7, 2019].

* cited by examiner

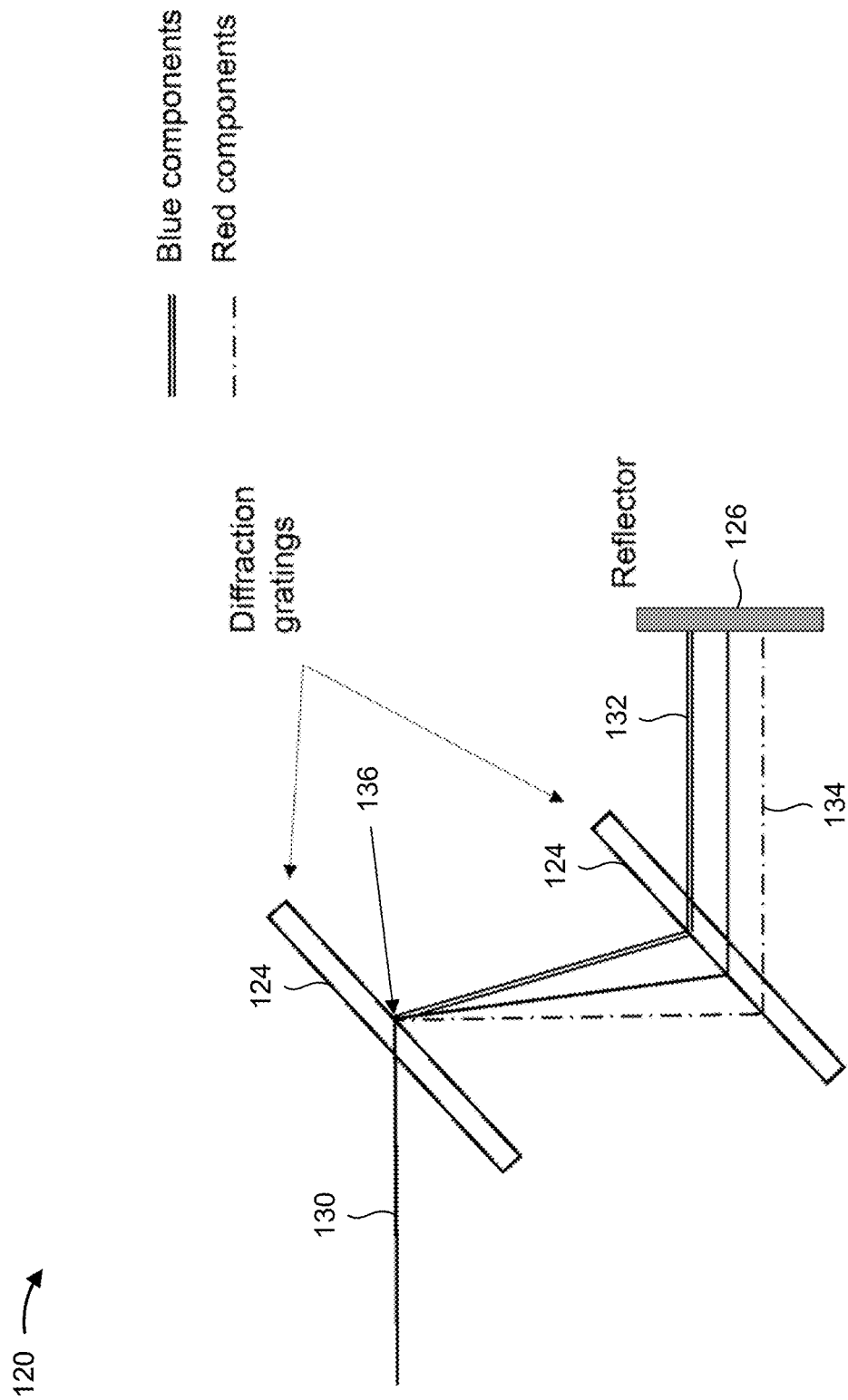

FEMTOSECOND FIBER OSCILLATOR

RELATED APPLICATION

This application claims the benefit of U.S. Provisional Patent Application No. 62/867,750, entitled "FEMTOSECOND FIBER OSCILLATOR," filed on Jun. 27, 2019, the content of which is incorporated by reference herein in its entirety.

TECHNICAL FIELD

The present disclosure generally relates to a fiber oscillator, and to an optical assembly including various devices that are arranged to invert an incident beam upon a second pass through the optical assembly to create a spatially dispersed output that provides dispersion control, modelocking, spectral filtering, and/or the like in a laser cavity.

BACKGROUND

Modelocking refers to techniques in optics by which a laser is configured to produce ultrashort pulses that have a pulse duration on the order of picoseconds (psec) or femtoseconds (fsec). Accordingly, a modelocked laser that is operated to produce ultrashort pulses is sometimes referred to as a femtosecond laser and/or the like. In general, a modelocked laser is coupled to a laser cavity that contains a modelocking device (or modelocker), which may be an active element such as an optical modulator, a nonlinear passive element such as a saturable absorber, and/or the like. The modelocking device causes an ultrashort pulse to be formed, which circulates in the laser cavity. In a steady state, effects that influence the circulating pulse are in balance so that pulse parameters are unchanged after each completed round trip, or often even nearly constant throughout each round trip. Each time the pulse hits an output coupler mirror, a usable pulse is emitted, so that a regular pulse train leaves the laser. Assuming a single circulating pulse, a pulse repetition period corresponds to a round-trip time in the laser cavity (typically several nanoseconds), whereas the pulse duration is much shorter. Accordingly, a modelocked laser can have a peak power orders of magnitude higher than an average power.

SUMMARY

According to some implementations, a fiber oscillator may comprise: a laser source configured to provide a beam into an active fiber of a laser cavity, wherein the beam propagates in a forward direction through the laser cavity and experiences gain in the active fiber; an output coupler that comprises an input port arranged to receive the beam after the beam passes through the active fiber, a first output port that couples into the laser cavity, and a second output port that leads to an output fiber; and an optical assembly coupled between the laser source and the output coupler, wherein the optical assembly comprises: a diffraction grating pair arranged to temporally and spatially disperse the beam on a forward pass through the optical assembly; a reflective device at an end of the optical assembly; and a focusing optic arranged to create a beam waist at the reflective device, wherein the beam waist created at the reflective device causes the beam to be inverted on a reverse pass through the optical assembly, and wherein a temporal dispersion and a spatial dispersion of the beam are doubled on the reverse pass through the optical assembly to form a temporally and spatially dispersed output that couples back into the laser cavity.

According to some implementations, an optical assembly may comprise: a diffraction grating pair arranged to temporally and spatially disperse a beam on a forward pass through the optical assembly; a reflective device at an end of the optical assembly; and a focusing optic arranged to create a beam waist at the reflective device, wherein the beam waist created at the reflective device causes the beam to be inverted on a reverse pass through the optical assembly, and wherein a temporal dispersion and a spatial dispersion of the beam are doubled on the reverse pass through the optical assembly to form a temporally and spatially dispersed output from the optical assembly.

According to some implementations, a method may comprise: receiving a beam at an optical assembly; temporally and spatially dispersing, by a diffraction grating pair of the optical assembly, the beam on a forward pass through the optical assembly; and creating, by a focusing optic of the optical assembly, a beam waist at a reflective device arranged at an end of the optical assembly, wherein the beam waist created at the reflective device causes the beam to be inverted on a reverse pass through the optical assembly, and wherein a temporal dispersion and a spatial dispersion of the beam are doubled on the reverse pass through the optical assembly to form a temporally and spatially dispersed output from the optical assembly.

BRIEF DESCRIPTION OF THE DRAWINGS

FIG. 1C is a diagram of an example dispersion control device including a pair of gratings that can be used in a modelocked oscillator.

DETAILED DESCRIPTION

Figure 1A:
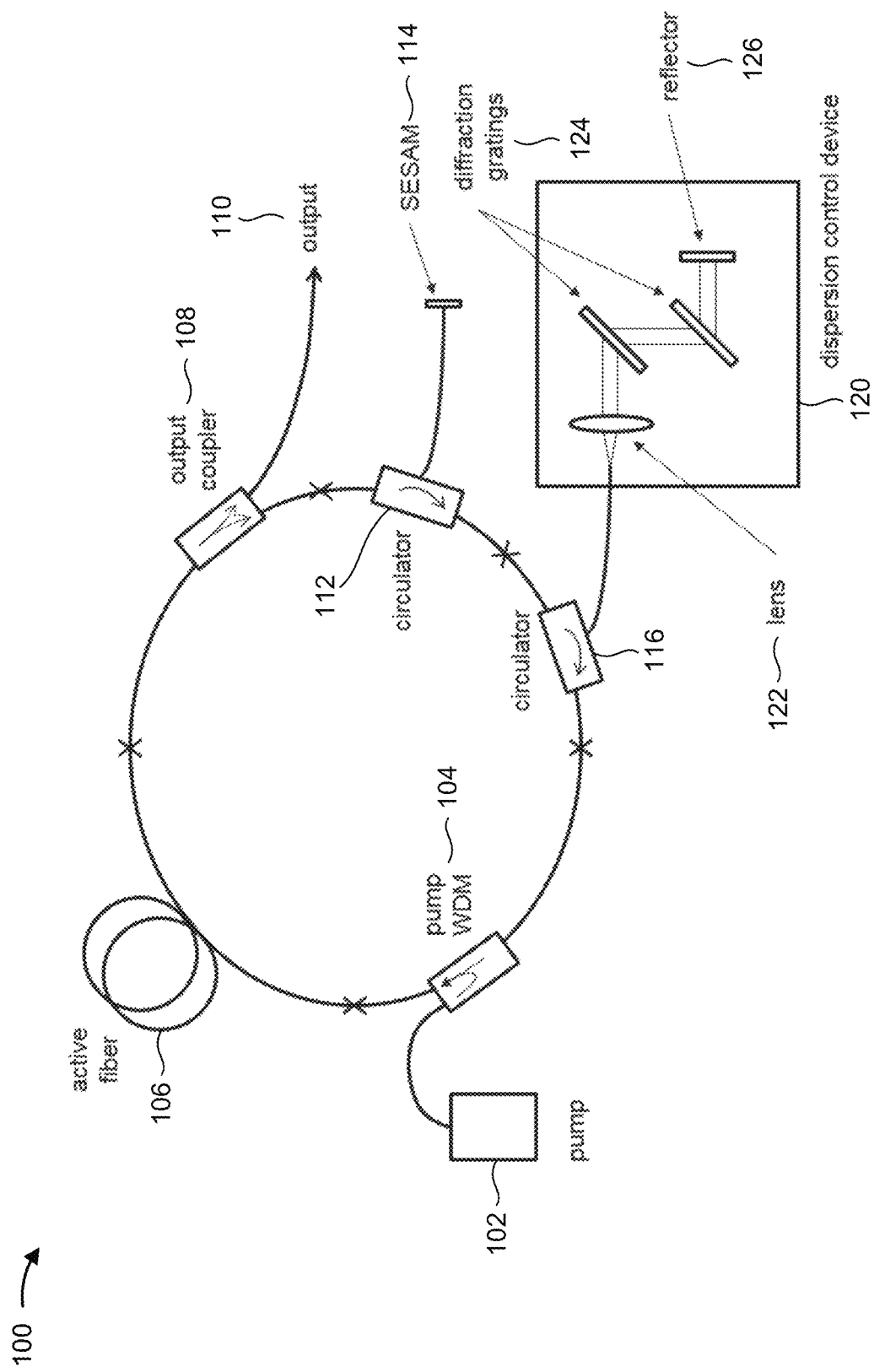
FIGS. 1A-1B are diagrams of one or more examples of a modelocked oscillator.

The following detailed description of example implementations refers to the accompanying drawings. The same reference numbers in different drawings may identify the same or similar elements.

Short-pulse fiber oscillators typically require particular combinations of dispersion, loss, saturable absorption, spectral filtering, and/or the like in order to operate properly. For example, in a 1-micron wavelength regime, standard optical fibers generally exhibit normal (e.g., positive) dispersion, which precludes the typical use of soliton modelocking as is common in the 1.5-micron regime, where pulses are stabilized by an interplay between nonlinear self-phase modulation (SPM) and anomalous dispersion in the fiber. The wavelengths of 1 micron (or micrometer) ($\mu$m) and 1.5 $\mu$m are two major wavelength ranges for which modelocked fiber lasers are often built using rare-earth-doped silica fiber oscillators and power amplifiers (e.g., Ytterbium (Yb) and Erbium (Er) dopants, respectively). At longer wavelengths, silica fibers tend to lose transparency. At shorter wavelengths, there are few rare-earth laser transitions suitable for diode pumping, and those that do exist tend to have a generally low efficiency. In general, because much higher power scaling is possible using Yb at 1 μm than Er at 1.5 μm, there tends to be a strong preference for 1 μm. For some applications, shorter wavelengths tend to lead to better performance. Accordingly, 1 μm is generally preferred over 1.5 μm, and in some applications, even shorter wavelengths generated by nonlinear harmonic conversion are desired (e.g., from 1 μm to ~520 nm or 345 nm).

As a result, in modelocked lasers in normal dispersion regimes (e.g., at a 1 micron wavelength), specific components are commonly used inside a cavity to provide negative dispersion and thereby offset positive dispersion of the fiber to create a net anomalous dispersion on a round-trip basis and enable soliton modelocking (sometimes called quasi-soliton modelocking and/or the like). For example, components that may be provided inside the cavity to provide the negative dispersion may include diffraction gratings, chirped fiber Bragg gratings, chirped volume Bragg gratings, prisms, grisms, and/or the like. However, adding components to the cavity will generally increase a length of the cavity, which may limit a maximum achievable laser repetition rate. In addition, because a minimum length of fiber is typically needed around each fiber component (e.g., diffraction gratings, optical circulators, spectral filters, and/or the like) in order to achieve a splice, the maximum achievable repetition rate generally decreases as a quantity of components present in the cavity increases.

Some implementations described herein relate to an optical assembly including various devices that are arranged to invert an incident beam upon a second pass through the optical assembly to create a temporally and spatially dispersed output that provides dispersion control, modelocking, spectral filtering, and/or the like in a modelocked fiber laser cavity. For example, as described herein, the optical assembly may include a diffraction grating pair arranged to temporally and spatially disperse a beam on a forward pass through the optical assembly, a reflective device at an end of the optical assembly, and a focusing optic arranged to create a beam waist at the reflective device. The beam waist created at the reflective device may cause the beam to be inverted on a reverse pass through the optical assembly, and a temporal dispersion and a spatial dispersion of the beam may be doubled on the reverse pass through the optical assembly to form a temporally and spatially dispersed output from the optical assembly. Furthermore, in some implementations, the optical assembly may include a collimating lens, an aperture, an apodizer, and/or the like to filter one or more wavelengths near a center of the beam on the reverse pass through the optical assembly. Accordingly, an extended linear beam may be incident upon the collimating lens coupling the beam back into a fiber in a laser cavity, and various wavelength components across the temporally and spatially dispersed output beam may have varying coupling efficiencies back into the fiber depending on whether the wavelength components are near the center of the beam or a periphery of the beam. In this way, the optical assembly may act as a spectral filter in addition to providing functions to control dispersion, enable modelocking, reduce loss, optimize saturable absorber positioning, and/or the like in a manner optimized for particular applications.

Figure 1B:
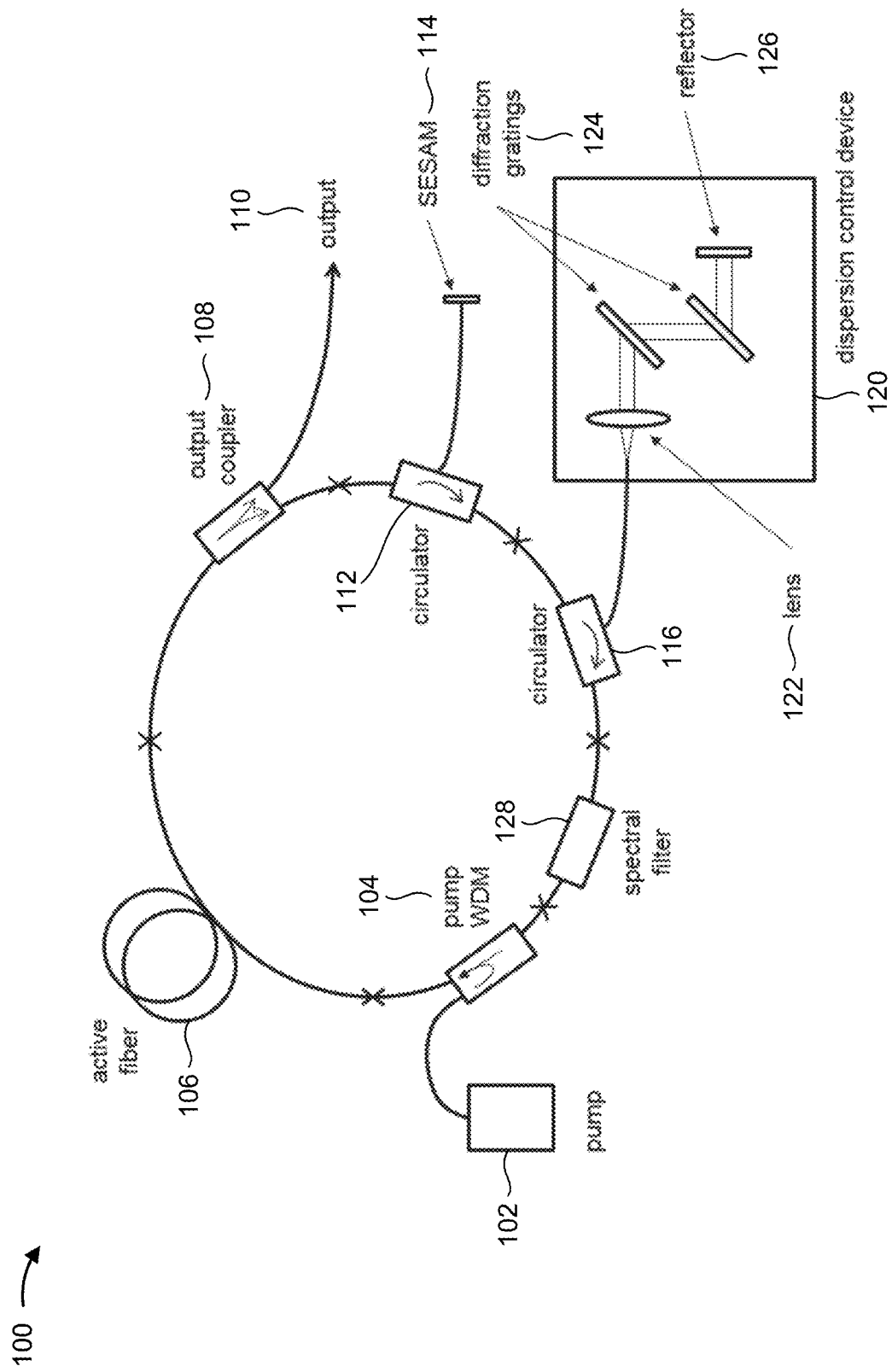

FIGS. 1A-1B are diagrams of one or more examples 100 of a modelocked oscillator. For example, in some implementations, the modelocked oscillator shown in FIG. 1A may be a soliton modelocked oscillator including a fiber ring cavity, a quasi-soliton modelocked oscillator including a fiber ring cavity, and/or the like. Furthermore, the modelocked oscillator shown in FIG. 1B may be a similariton modelocked oscillator including a fiber ring cavity and/or the like. In some implementations, the modelocked oscillators shown in FIGS. 1A-1B may operate polarized, using polarizing or polarization-maintaining fiber and components. Additionally, or alternatively, in some implementations, the modelocked oscillators may be unpolarized.

As shown in FIG. 1A, the modelocked oscillator may include a pump 102 and a pump wavelength division multiplexer (WDM) 104 configured as a laser source to generate or otherwise provide a beam that propagates in a forward direction (e.g., clockwise) through a ring cavity. Accordingly, as shown in FIG. 1A, the beam may circulate in the clockwise direction around the ring cavity and propagate through an active fiber 106 where the beam experiences gain (e.g., is amplified). For example, the active fiber 106 may act as a gain medium, and may include a glass fiber doped with rare earth ions such as erbium, neodymium, ytterbium, praseodymium, thulium, and/or the like.

As shown in FIG. 1A, after passing through the active fiber 106, the beam then passes through an output coupler 108 having a first output port that couples onto an output fiber 110 and a second output port that couples into the ring cavity. Accordingly, after passing through the output coupler 108, the beam may pass through a reflective modelocker device (e.g., a semiconductor saturable absorber mirror (SESAM)) 114 via a first optical circulator 112, and then through a double-pass dispersion control device 120 via a second optical circulator 116 before returning to the active fiber 106. For example, as shown in FIG. 1A, the double-pass dispersion-control device 120 may include a lens 122, a pair of diffraction gratings 124, and a reflector 126 that are arranged to provide a negative group-delay dispersion (GDD) that more than offsets a positive GDD of the active fiber 106 and thereby enables operation in the soliton regime. In FIG. 1A, the output coupler 108 may be an all-fiber fused coupler, a pigtailed partial reflector type device, and/or the like. In general, the output coupler 108 may operate according to one or more output coupling parameters that depend on specifics of a design of the modelocked oscillator. For example, in some implementations, the output coupler 108 may operate according to one or more output coupling parameters in a range from about 20% to about 80% output coupling.

Additionally, there are existing schemes for modelocking in normal dispersion regimes, such as similariton modelocking and All-Normal Dispersion (ANDi) modelocking, where SPM is not balanced by dispersion. Rather, in the existing schemes for modelocking in normal dispersion regimes, the SPM and dispersion work together to continually stretch and chirp a pulse, and a spectral filter is added to the cavity to reset a spectral width and pulse duration on every round trip. In similariton-type schemes, some negative dispersion may be provided to partially offset the normal dispersion in the fiber, although the amount of negative dispersion provided to offset the normal dispersion is generally less than an amount that would cause a net dispersion per round trip to be negative (e.g., anomalous). For example, as shown in FIG. 1B, the fiber ring cavity in the similariton modelocked oscillator ring cavity may generally have a similar combination and arrangement of components as shown in FIG. 1A. However, in FIG. 1B, the dispersion control device 120 may be adjusted to provide only partial offsetting of the normal dispersion so that the net dispersion per round trip is not negative. Additionally, as shown in FIG. 1B, a spectral filter 128 is provided to continually limit a spectral width.

FIG. 1C is a diagram of an example dispersion control device 120 including a pair of gratings (e.g., diffraction gratings) 124 that can be used in a modelocked oscillator, such as the soliton (or quasi-soliton) modelocked oscillator shown in FIG. 1A, the similariton modelocked oscillator shown in FIG. 1B, and/or the like. As shown in FIG. 1C, the pair of gratings 124 may be arranged as a Treacy grating pair. Additionally, or alternatively, in some implementations, a pair of lenses (not shown) may be arranged between the pair of gratings 124 to provide positive dispersion, in which case the pair of gratings 124 may be referred to as a Martinez grating pair.

As shown in FIG. 1C, a beam 130 received or otherwise input to the dispersion control device 120 is collimated (e.g., separated into parallel light rays 132, 134) on a forward pass through the pair of gratings 124. Furthermore, as shown in FIG. 1C, the beam is spatially dispersed (forming a horizontal line beam with varying wavelength across the beam) after the forward pass through the pair of gratings 124. As further shown in FIG. 1C, after the forward pass through the pair of gratings 124, the reflector 126 reflects the beam on a backward pass through the pair of gratings 124 and the light rays 132, 134 retrace a path that was followed on the forward pass through the pair of gratings 124. Accordingly, the light rays 132, 134 are brought back together into a single spot 136 before entering a lens (e.g., the lens 122 shown in FIGS. 1A-1B) to focus back into a pigtail fiber of an optical circulator (e.g., the optical circulator 116 shown in FIGS. 1A-1B). In this case, a desired temporal (group-delay) dispersion is doubled rather than being undone on the backward pass through the pair of gratings 124.

As indicated above, FIGS. 1A-1C are provided merely as one or more examples. Other examples may differ from what is described with regard to FIGS. 1A-1C.

Figure 2A:
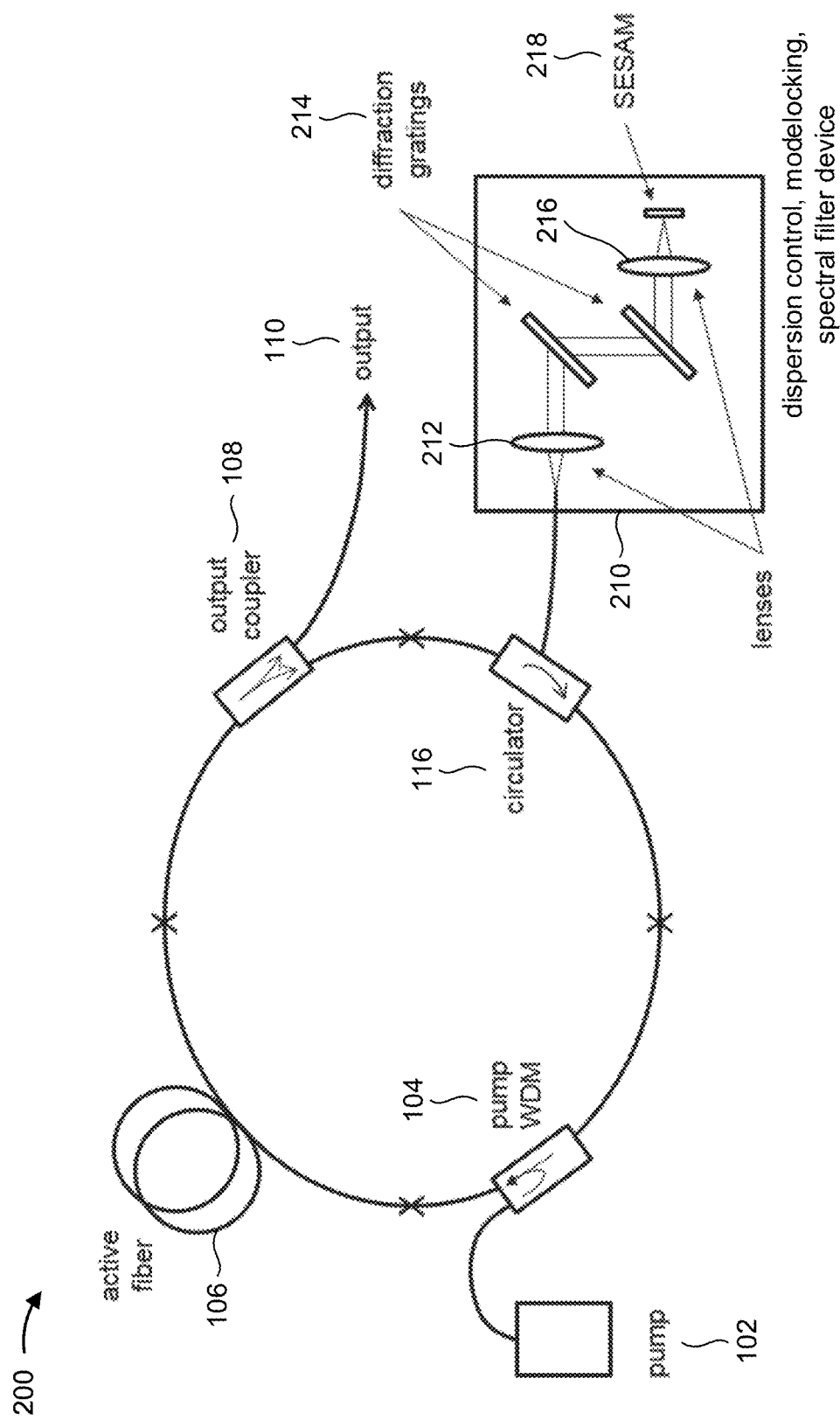
FIGS. 2A-2B are diagrams of one or more example implementations of an optical assembly that provides dispersion control, modelocking, spectral filtering, and/or the like in a laser cavity.
Figure 2B:
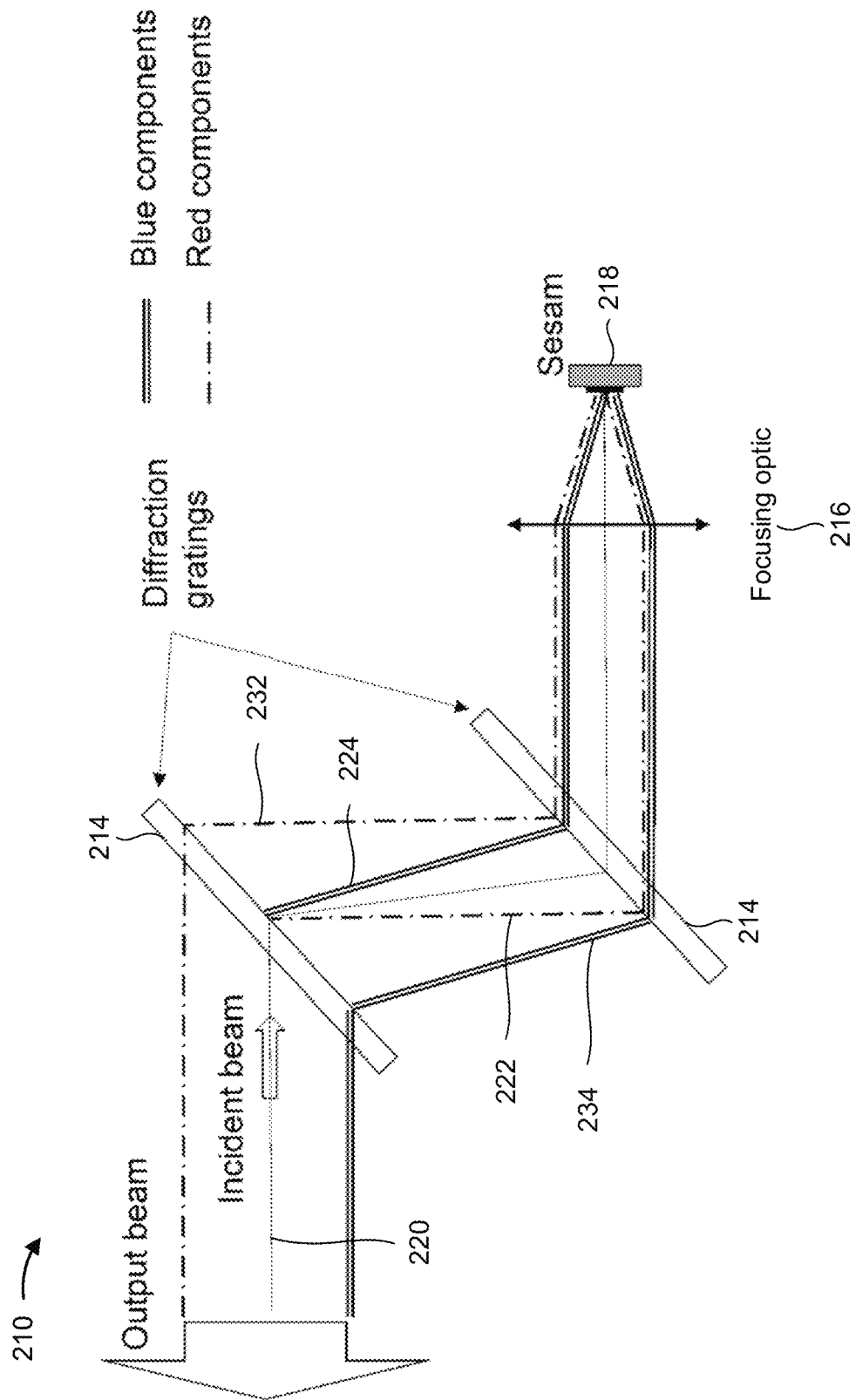

FIGS. 2A-2B are diagrams of one or more example implementations 200 of an optical assembly 210 that provides dispersion control, modelocking, spectral filtering, and/or the like in a laser cavity. For example, as shown in FIG. 2A, the optical assembly 210 may include a collimating lens 212, a pair of diffraction gratings 214, a focusing optic (e.g., a lens, a concave mirror, and/or the like) 216, and a reflective modelocking device (e.g., a SESAM) 218. As shown in FIG. 2A, the reflective modelocking device 218 may be positioned, along with the focusing optic 216, at a reflective end of the optical assembly 210. Accordingly, in the arrangement shown in FIG. 2A, the focusing optic 216 may create a beam waist at the reflective modelocking device 218 and cause the beam to be inverted on a second pass through the pair of diffraction gratings 214. In this way, by causing the beam to be inverted upon the second pass through the pair of diffraction gratings 214, the optical assembly 210 may produce a temporally and spatially dispersed output that provides spectral filtering in addition to dispersion control and modelocking in the laser cavity. Accordingly, as shown in FIG. 2A, the optical assembly may be implemented or otherwise function as a dispersion control device, a modelocking device, a spectral filter device, and/or the like.

For example, FIG. 2B illustrates the optical assembly 210 in further detail. As shown in FIG. 2B, an incident beam 220 received or otherwise input to the optical assembly 210 may be collimated (e.g., separated into parallel light rays 222, 224) on a forward pass through the pair of diffraction gratings 214 in a similar manner as described above with reference to FIG. 1C. In this case, however, the wavelength-dispersed light rays 222, 224 do not retrace a path through the pair of diffraction gratings 214. Rather, because the focusing optic 216 creates a beam waist (focusing the wavelength-dispersed light rays 222, 224) at the reflective modelocking device 218, a spatial dispersion of the wavelength-dispersed light rays 222, 224 is doubled on the reverse path through the pair of diffraction gratings 214. Furthermore, in some implementations, a temporal (group-delay) dispersion of the wavelength-dispersed light rays 222, 224 may be doubled on the reverse path through the pair of diffraction gratings 214. For example, as shown in FIG. 2B, and by reference numbers 232, 234, red and blue components are shifted spatially such that a coupling of the red and blue components back into the fiber is reduced. Because the fiber coupling as a function of shift has a Gaussian dependence, the characteristic filter shape is Gaussian. A numerical example is discussed below with reference to FIG. 3.

Accordingly, with reference to FIG. 2A and FIG. 2B, an extended linear beam may be incident upon the collimating lens 212 coupling the beam back into the fiber (e.g., via optical circulator 116). The various wavelength components across the beam may have varying coupling efficiencies back into the fiber depending on whether the various wavelength components are near a center of the beam or a periphery of the beam. In this way, the optical assembly 210 acts as a spectral filter device in addition to providing the functions of a dispersion control device, a SESAM modelocking device, and/or the like.

Furthermore, in some implementations, the reflective modelocking device 218 may be positioned at the end of the optical assembly 210 to control a laser fluence parameter that may lead to saturation. For example, depending on where the reflective modelocking device 218 is located in the laser cavity, there may be higher or lower laser fluence on the reflective modelocking device 218 at a given pump power, which would essentially vary a laser threshold. Accordingly, to decrease losses in the cavity and thereby decrease the laser threshold, and because the optical circulator 116 tends to be a lossy component, the reflective modelocking device 218 may be positioned within the optical assembly 210 that functions as a dispersion control device. In this way, one or more optical circulators may be removed from the cavity (e.g., relative to the arrangements shown in FIGS. 1A-1B), which decreases losses in the cavity. Furthermore, because the optical assembly 210 acts as a spectral filter device, there is no need to include a separate spectral filter in the cavity (e.g., as in the arrangement shown in FIG. 1B).

In some implementations, the diffraction grating pair 214 may have various design parameters that allow the GDD to be tuned separately from the spectral filtering. For example, the design parameters that allow the GDD to be separately tuned may include a pitch or line density (e.g., lines per millimeter) of the diffraction grating pair 214, a spacing between the pair of diffraction gratings 214, an angle between the diffraction grating pair 214 (often near Littrow to maximize transmission), and/or the like. In some implementations, the reflective modelocking device 218 may be a saturable absorber (e.g., a SESAM), meaning that the reflective modelocking device 218 has a high absorption until a certain energy density per unit area (e.g., Joules per square centimeter ($J/cm^2$)) is reached, at which point absorption drops rapidly. This characteristic of the reflective modelocking device 218 may cause the laser to favor a modelocked (or short-pulsed) operation over continuous-wave (CW) operation. Changing the laser spot size on the reflective modelocking device 218 changes the energy density per unit area, thereby changing the characteristic energy level at which the reflective modelocking device 218 saturates. This affects the operating power range where the reflective modelocking device 218 will be effective in stabilizing modelocked operation. The focal length of the focusing optic 216 in front of the reflective modelocking device 218 has no effect on the GDD or spectral filtering. However, the focal length of the focusing optic 216 may be varied to independently adjust a spot size upon the reflective modelocking device 218.

As indicated above, FIGS. 2A-2B are provided merely as one or more examples. Other examples may differ from what is described with regard to FIGS. 2A-2B.

Figure 3:
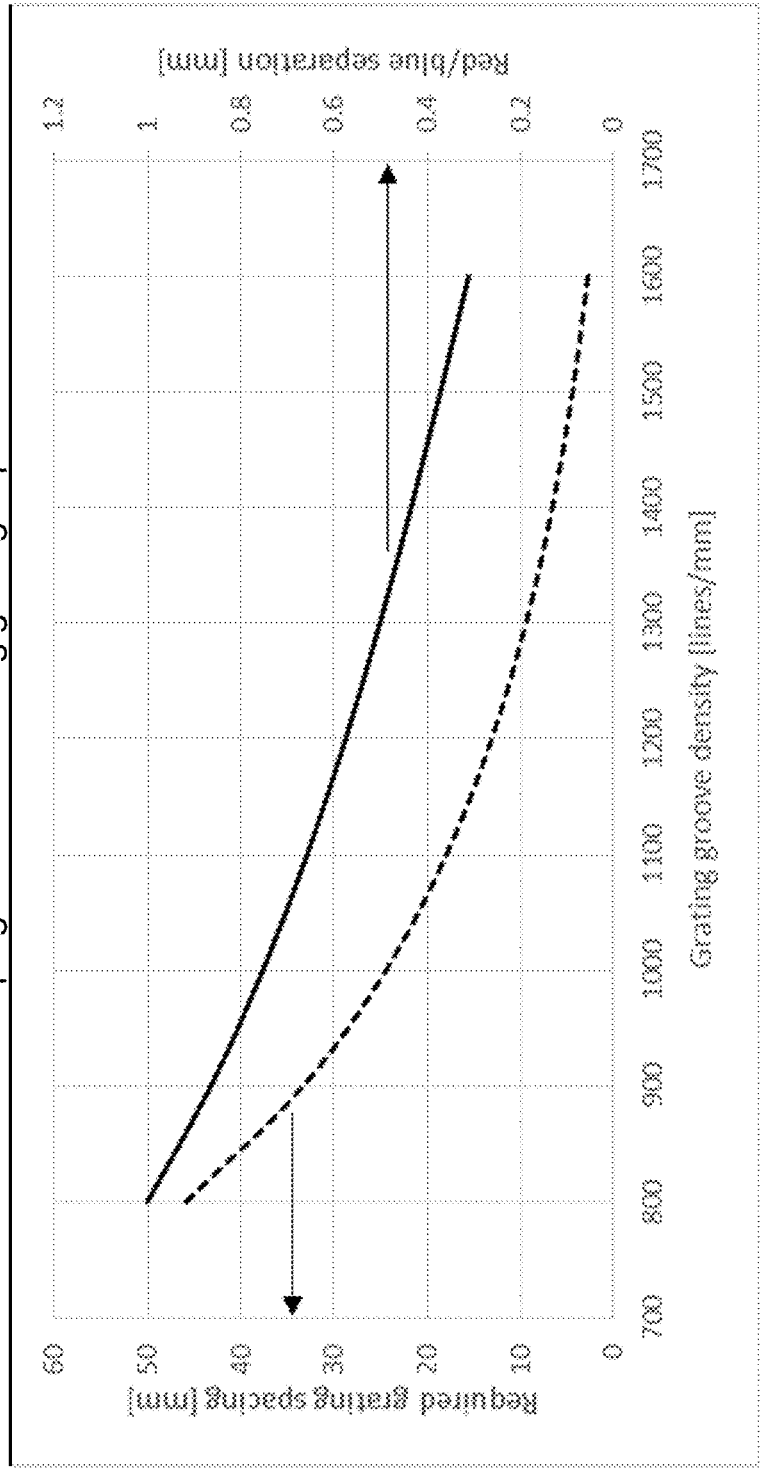
FIG. 3 is a diagram of an example calculation showing how spectral filtering can be independently controlled using the optical assembly shown in FIGS. 2A-2B.

FIG. 3 is a diagram of an example calculation 300 showing how spectral filtering can be independently controlled using the optical assembly shown in FIGS. 2A-2B. More particularly, in FIG. 3, the example calculation 300 illustrates independent control over spectral filtering by varying grating groove density and/or grating separation, while keeping GDD fixed. The example calculation 300 shown in FIG. 3 generally assumes a center wavelength of 1030 nm, a spectral width of 8 nm, and gratings in a Littrow configuration. As shown in FIG. 3, for a fixed GDD induced in the pair of diffraction gratings 214 (e.g., −0.15 ps$^2$), any amount of red/blue separation from 0.3 mm to 1.0 mm can be chosen by varying the grating groove density between 800 and 1600 lines/mm and/or by varying the spacing between the pair of diffraction gratings 214 in a range between about 3 mm and about 46 mm.

In some implementations, spatial separation maps into spectral filtering as a function of the collimated beam size after the collimating lens 212. For example, the focal length for the collimating lens 212 does not affect GDD, whereby the focal length for the collimating lens 212 can be varied to provide another independent parameter that can be tuned to adjust the spectral filter shape. For example, a 4 mm focal length for the collimating lens 212 may collimate a beam of 1030 nm light from a polarization-maintaining 980 (PM980) nanometer fiber into a beam with a diameter of roughly 0.75 mm (or a radius of roughly 0.375 mm). In this example, if the pair of diffraction gratings 214 provides 1.0 mm separation (0.5 mm separation from spectral center), then the transmission of the filter for the extreme red or blue components is calculated as $\exp(-0.5^2/0.375^2)=16.9\%$. Accordingly, in this example, there is strong clipping at the red and blue wavelength extremes, and the filter transmission function is Gaussian shaped.

Another technique to adjust the spectral filtering in the optical assembly 210 may be to add an optic, such as an aperture, an apodizer, and/or the like, with a transmission that spatially varies (e.g., high transmission in the center) and tapers off to the sides. The spectral width as limited by the collimating lens 212 in this case would typically be chosen to be wider than the spectral width as determined by the optic, whereby a profile of the optic may dominate an effective filter profile. Because the spatial transmission of an optic such as an aperture or an apodizer can be tailored by design, other transmission curve shapes can be defined. For example, a parabolic spectral filter shape may be generated using a one-dimensional spatial parabolic profile in the apodizer.

In this way, as shown in FIG. 2A, only one optical circulator 116 may be needed in a ring cavity to accommodate both the reflective modelocking device 218 and the pair of diffraction gratings 214, which saves cost, reduces optical loss, and/or the like. Furthermore, if a configuration of the diffraction gratings 214 and the reflective modelocking device 218 in the optical assembly 210 described herein is used as one end of a linear cavity, no circulators are necessary, which saves further costs, further reduces optical loss, and/or the like. Furthermore, in a similariton laser, some implementations described herein may allow rapid and precise adjustment of both the dispersion and the spectral filter width, which enables laser performance to be optimized and tuned in a straightforward and flexible manner. In a soliton laser, some implementations described herein may use a spectral filter to improve soliton laser operation. For example, in some implementations, the spectral filter may be broad enough to not impact the pulse spectral shape while allowing for fine tuning of the central wavelength. Furthermore, using a free space arm in a fiber oscillator may provide flexibility to adjust various parameters that may affect laser performance, laser lifetime, and/or the like. For example, an amount of negative dispersion, spectral filtering, a spot size on the reflective modelocking device 218, and/or the like can be separately fine-tuned as described above.

Accordingly, the optical assembly 210 described herein increases spatial dispersion (e.g., a separation between "blue" and "red" wavelengths), and then filters the wavelengths near the center of the beam, which may affect the operation of the laser. If the laser is naturally operating with a bandwidth that is less than a filtering level (e.g., the laser is all within the "green" area), then there is little or no effect. However, if the filtering is strong enough to cut into the natural bandwidth (or, conversely, if the natural bandwidth is wider than the filtering), then there will be a noticeable effect. Strong filtering that starts to affect the actual lasing spectrum will likely degrade the stability of the pulse shape and the modelocking, since soliton modelocking relies on a balance of dispersion and nonlinearity. Thus, for a soliton-modelocked laser, the filtering should be adjusted so that the filtering does not significantly cut down the natural bandwidth. However, the filtering may still be used to shift the center wavelength (e.g., to make the laser operate at the correct wavelength). In a similariton-modelocked laser, a spectral filter is a required part of the cavity, since on every round-trip the spectrum would otherwise grow wider. The spectral filtering created by some implementations described herein thus takes the place of a standalone spectral filter, and may operate as a variable filter.

In this way, the spectral filtering can have an effect of modifying an output laser spectral width (and therefore a pulse duration of the output laser) and central wavelength. However, in the case of a soliton regime, the spectral filtering may be unlikely to affect a spectral shape of the output laser, which is typically predefined and usually a Fourier Transform of a squared hyperbolic secant (sech$^2$). Kelly bands appear at the tails of the laser spectrum when the pulse energy reaches a certain level. The spectral filtering could narrow the full width at half maximum of the spectrum, but is unlikely to filter the Kelly bands out as this would mean modifying the spectral shape, and in the soliton regime the spectral shape is fixed. To decrease the Kelly bands, the laser may be operated at a lower energy (e.g., by changing the output coupling) or the Kelly bands may be filtered outside the laser cavity. In this way, the optical assembly 210 may allow a central wavelength and a spectral width (and therefore an output pulse duration) to be adjusted within a finite spectral window (e.g., for Yb doped active fiber based cavities lasing wavelengths between 1020 and 1040 nm).

As indicated above, FIG. 3 is provided merely as an example. Other examples may differ from what is described with regard to FIG. 3.

Figure 4:
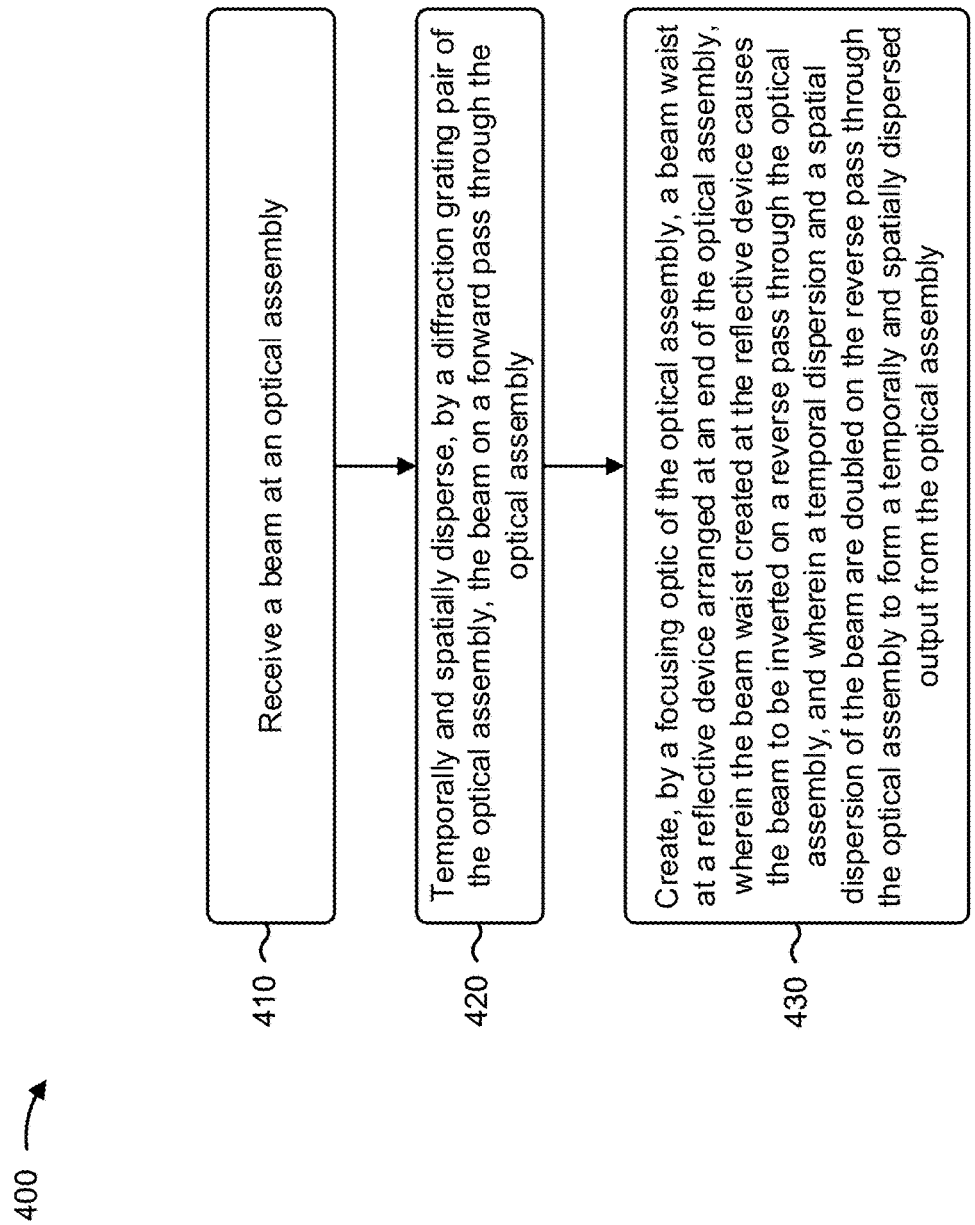
FIG. 4 is a flowchart of an example process for using an optical assembly in a femtosecond fiber oscillator as described herein.

FIG. 4 is a flowchart of an example process 400 for using an optical assembly in a femtosecond fiber oscillator as described herein. In some implementations, one or more process blocks shown in FIG. 4 may be performed by one or more devices in an optical assembly, such as a collimating lens (e.g., collimating lens 212), a diffraction grating pair (e.g., diffraction grating pair 214), a focusing optic (e.g., focusing optic 216), a reflective modelocking device (e.g., reflective modelocking device 218), and/or the like.

As shown in FIG. 4, process 400 may include receiving a beam at an optical assembly (block 410). For example, as described above, an incident beam 220 may be received at an optical assembly 210.

As further shown in FIG. 4, process 400 may include temporally and spatially dispersing, by a diffraction grating pair of the optical assembly, the beam on a forward pass through the optical assembly (block 420). For example, as described above, the optical assembly 210 may include a diffraction grating pair 214 arranged to temporally and spatially disperse the incident beam 220 on a forward pass through the optical assembly 210.

As further shown in FIG. 4, process 400 may include creating, by a focusing optic of the optical assembly, a beam waist at a reflective device arranged at an end of the optical assembly, wherein the beam waist created at the reflective device causes the beam to be inverted on a reverse pass through the optical assembly, and wherein a temporal dispersion and a spatial dispersion of the beam are doubled on the reverse pass through the optical assembly to form a temporally and spatially dispersed output from the optical assembly (block 430). For example, as described above, the optical assembly 210 may include a focusing optic 216 arranged to create a beam waist at a reflective modelocking device 218 arranged at an end of the optical assembly 210. In some implementations, the beam waist created at the reflective modelocking device 218 may cause the beam to be inverted on a reverse pass through the optical assembly 210. Furthermore, in some implementations, a temporal dispersion and a spatial dispersion of the beam may be doubled on the reverse pass through the optical assembly 210 to form a spatially dispersed output from the optical assembly 210.

Process 400 may include additional implementations, such as any single implementation or any combination of implementations described below and/or in connection with one or more other processes described elsewhere herein.

In a first implementation, the beam waist created at the reflective device may have a spot size upon the reflective device that is dependent on a focal length of the focusing optic. For example, as described above, the beam waist has a spot size upon the reflective modelocking device 218 that is dependent on a focal length of the focusing optic 216.

In a second implementation, alone or in combination with the first implementation, process 400 may further include filtering, by one or more of a collimating lens, an aperture, or an apodizer of the optical assembly, one or more wavelengths near a center of the beam when coupling into a fiber following the reverse pass through the optical assembly. For example, as described above, the optical assembly 210 may include a collimating lens 212 having a focal length to filter one or more wavelengths near a center of the beam when coupling into the fiber following the reverse pass through the optical assembly 210. Additionally, or alternatively, spectral filtering in the optical assembly 210 may be adjusted using an optic, such as an aperture, an apodizer, and/or the like.

In a third implementation, alone or in combination with one or more of the first and second implementations, the optical assembly 210 may provide a negative group-delay dispersion that depends on a pitch of the diffraction grating pair 214, a line density of the diffraction grating pair 214, a spacing between the diffraction grating pair 214, an angle between the diffraction grating pair 214, and/or the like.

In a fourth implementation, alone or in combination with one or more of the first through third implementations, the optical assembly 210 is implemented as one or more of a dispersion control device, a modelocking device, or a spectral filter device.

In a fifth implementation, alone or in combination with one or more of the first through fourth implementations, the reflective device 218 at the end of the optical assembly 210 may include a semiconductor saturable absorber mirror (SESAM).

In a sixth implementation, alone or in combination with one or more of the first through fifth implementations, the focusing optic 216 may include a lens, a concave mirror, and/or the like.

In a seventh implementation, alone or in combination with one or more of the first through sixth implementations, the optical assembly 210 may be implemented or otherwise included in a fiber oscillator that includes a laser source (e.g., a pump 102, pump WDM 104, and/or the like) configured to provide a beam into an active fiber 106 of a laser cavity and an output coupler 108 that includes an input port arranged to receive the beam after the beam passes through the active fiber 106, a first output port that couples into the laser cavity, and a second output port that leads to an output fiber 110. In this case, the optical assembly 210 may be coupled between the laser source and the output coupler 108. Furthermore, in some implementations, the beam may propagate in a forward direction through the laser cavity and experience gain in the active fiber before received at the optical assembly 210.

In an eighth implementation, alone or in combination with one or more of the first through seventh implementations, the laser cavity may include a ring cavity in which the optical assembly 210 is coupled between the laser source and the first output port of the output coupler 108 via an optical circulator 116.

In a ninth implementation, alone or in combination with one or more of the first through eighth implementations, the laser cavity may include a linear cavity in which the optical assembly 210 is positioned at one end of the linear cavity.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

The foregoing disclosure provides illustration and description, but is not intended to be exhaustive or to limit the implementations to the precise forms disclosed. Modifications and variations may be made in light of the above disclosure or may be acquired from practice of the implementations.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A fiber oscillator, comprising:
an active fiber of a laser cavity,
wherein a beam propagates in a forward direction through the laser cavity and experiences gain in the active fiber;
an optical assembly comprising:
a diffraction grating pair arranged to temporally and spatially disperse the beam on a forward pass through the optical assembly,
a reflective device at an end of the optical assembly, and
a focusing optic arranged to create a beam waist at the reflective device,
wherein the beam waist created at the reflective device causes the beam to be inverted on a reverse pass through the optical assembly, and
wherein a temporal dispersion and a spatial dispersion of the beam are doubled on the reverse pass through the optical assembly to form a temporally and spatially dispersed output that couples back into the laser cavity;
a fiber-based optical circulator that couples the optical assembly to the laser cavity; and
a fiber coupler coupled between the active fiber and the optical assembly, the fiber coupler comprising:
an input port arranged to receive the beam from the active fiber,
a first output port that couples into the laser cavity, and
a second output port that leads to an output fiber.

2. The fiber oscillator of claim 1, wherein the beam waist has a spot size upon the reflective device that is dependent on a focal length of the focusing optic.

3. The fiber oscillator of claim 1, wherein the optical assembly further comprises one or more of a collimating lens, an aperture, or an apodizer to filter one or more wavelengths near a center of the beam following the reverse pass through the optical assembly.

4. The fiber oscillator of claim 1, wherein the optical assembly is configured to provide a negative group-delay dispersion that depends on one or more of:
a pitch of the diffraction grating pair,
a line density of the diffraction grating pair,
a spacing between the diffraction grating pair, or
an angle between the diffraction grating pair.

5. The fiber oscillator of claim 1, wherein the reflective device comprises a semiconductor saturable absorber mirror.

6. The fiber oscillator of claim 1, wherein the focusing optic comprises one or more of a lens or a concave mirror.

7. The fiber oscillator of claim 1,
wherein the laser cavity is a ring cavity.

8. The fiber oscillator of claim 1, wherein the laser cavity is a linear cavity in which the optical assembly is positioned at one end of the linear cavity.

9. The fiber oscillator of claim 1, wherein the optical assembly is one or more of:
a dispersion control device,
a modelocking device, or
a spectral filter device.

10. A fiber oscillator, comprising:
an active fiber that is configured to amplify a beam;
an optical assembly comprising:
a diffraction grating pair arranged to temporally and spatially disperse a beam on a forward pass through the optical assembly,
a reflective device at an end of the optical assembly, and
a focusing optic arranged to create a beam waist at the reflective device,
wherein the beam waist created at the reflective device causes the beam to be inverted on a reverse pass through the optical assembly, and
wherein a temporal dispersion and a spatial dispersion of the beam are doubled on the reverse pass through the optical assembly to form a temporally and spatially dispersed output from the optical assembly; and
a fiber coupler coupled between the active fiber and the optical assembly and configured to transmit the beam from the active fiber to the optical assembly, via a fiber-based optical circulator.

11. The fiber oscillator of claim 10, wherein the beam waist has a spot size upon the reflective device that is dependent on a focal length of the focusing optic.

12. The fiber oscillator of claim 10, further comprising:
an optic to filter one or more wavelengths near a center of the beam on the reverse pass through the optical assembly, wherein the optic comprises one or more of a collimating lens, an aperture, or an apodizer.

13. The fiber oscillator of claim 10, wherein a negative group-delay dispersion provided by the optical assembly depends on one or more of:
a pitch of the diffraction grating pair,
a line density of the diffraction grating pair,
a spacing between the diffraction grating pair, or
an angle between the diffraction grating pair.

14. The fiber oscillator of claim 10, wherein the reflective device comprises a semiconductor saturable absorber mirror.

15. The fiber oscillator of claim 10, wherein the focusing optic comprises one or more of a lens or a concave mirror.

16. A method, comprising:
receiving, from a fiber coupler and via a fiber-based optical circulator, an amplified beam at an optical assembly;
temporally and spatially dispersing, by a diffraction grating pair of the optical assembly, the amplified beam on a forward pass through the optical assembly; and
creating, by a focusing optic of the optical assembly, a beam waist at a reflective device arranged at an end of the optical assembly, wherein the beam waist created at the reflective device causes the amplified beam to be inverted on a reverse pass through the optical assembly, and wherein a temporal dispersion and a spatial dispersion of the amplified beam are doubled on the reverse pass through the optical assembly to form a temporally and spatially dispersed output from the optical assembly.

17. The method of claim 16, wherein the beam waist has a spot size upon the reflective device that is dependent on a focal length of the focusing optic.

18. The method of claim 16, further comprising:
filtering, by one or more of a collimating lens, an aperture, or an apodizer of the optical assembly, one or more wavelengths near a center of the amplified beam when coupling into a fiber following the reverse pass through the optical assembly.

19. The method of claim 16, wherein the optical assembly provides a negative group-delay dispersion that depends on one or more of:
a pitch of the diffraction grating pair,
a line density of the diffraction grating pair,
a spacing between the diffraction grating pair, or
an angle between the diffraction grating pair.

20. The method of claim 16, wherein the optical assembly is one or more of:
a dispersion control device,
a modelocking device, or
a spectral filter device.

* * * * *